Patented July 4, 1933

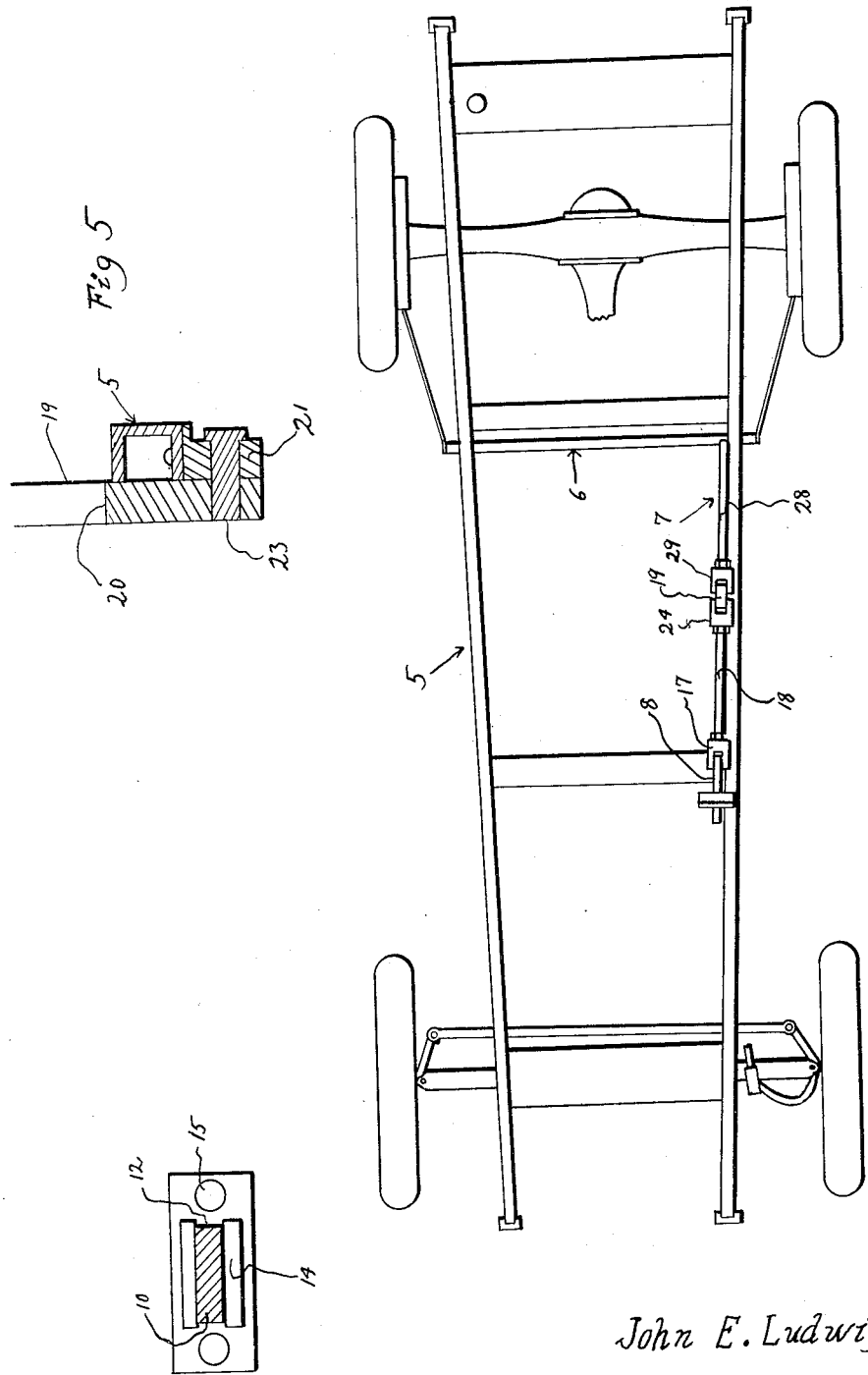

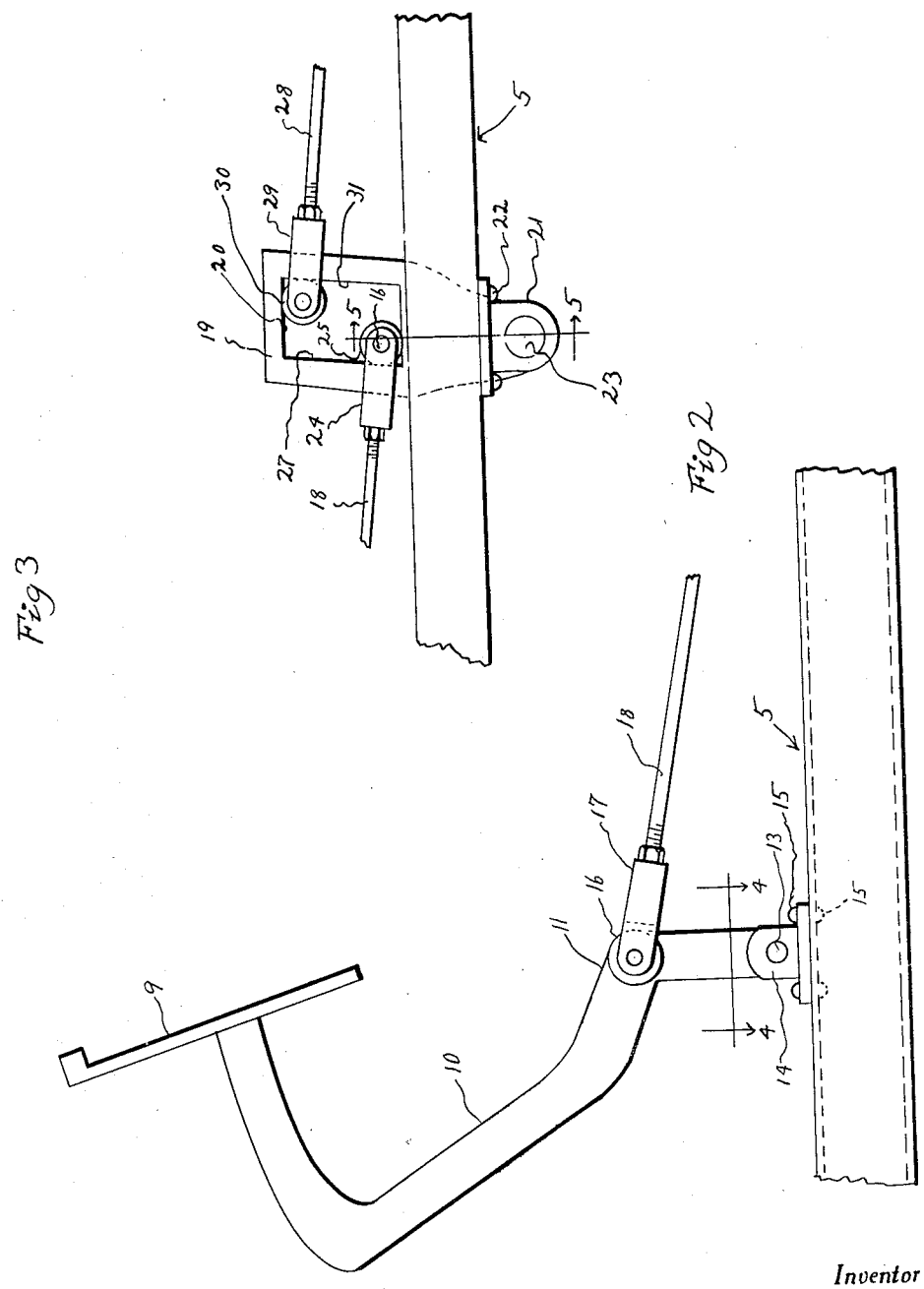

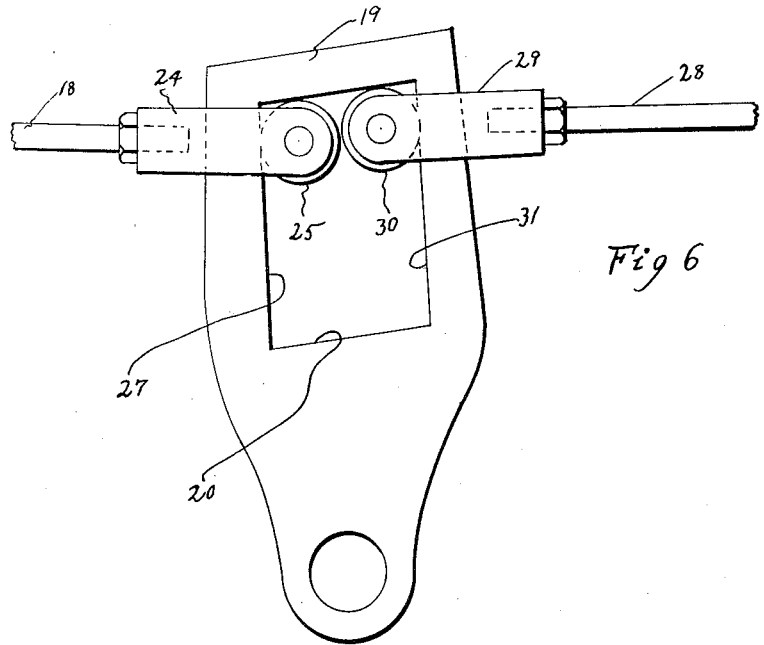
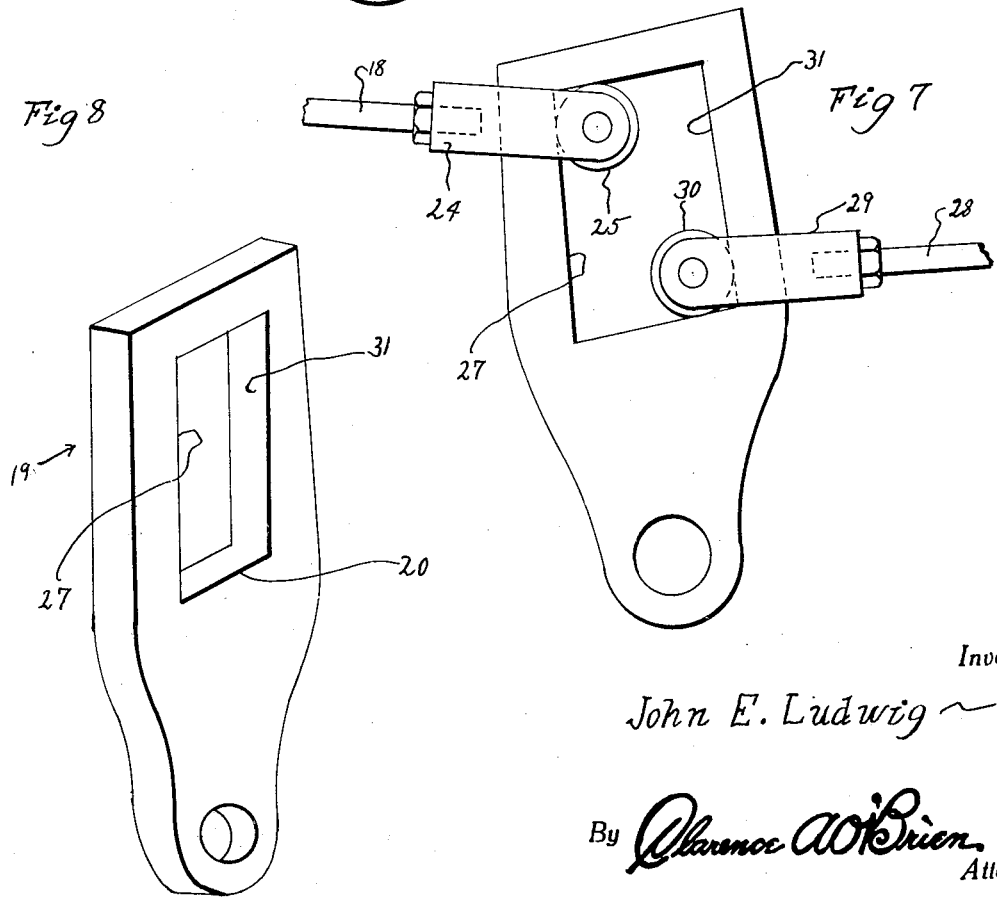

1,916,323

UNITED STATES PATENT OFFICE

JOHN E. LUDWIG, OF MIAMI, FLORIDA

BOOSTER

Application filed November 21, 1930. Serial No. 497,324.

This invention relates to mechanical brake boosters and particularly to a mechanical brake booster adapted for incorporation in the braking system of an automobile or other vehicle employing mechanical manually or foot-operated brakes, and possesses the features of novelty and advantage hereinafter described.

The ordinary foot and hand braking system of a motor vehicle provides that the braking force be transmitted through a fixed set set of levers and to the brake equalizers or toggles, and the action of these levers is practically constant throughout the braking operation. In such a system, the operation of taking up the slack and the brake band clearance is the same as obtained in actually applying the brake power to the wheels, and the devices so far known for doing away with the disadvantages of said system are complicated, expensive, and inadequate as well as unsatisfactory.

It is an object of this invention to provide a device of the character described above, which provides that a gradually increasing braking force results from the usual manner of applying the brakes, which can be very easily installed, is simple of construction, free from need of frequent repair and maintenance and which is simple and easy to manufacture and very inexpensive.

These and other objects of the invention, its nature and composition and combination and arrangement of parts will be readily understood by any one acquainted with the art to which this invention relates upon consulting the following descriptions of the drawings, in which:—

Figure 1 is a top plan view of an automobile chassis disclosing the ordinary arrangement of braking system, showing my improved brake booster in operative position thereon.

Figure 2 is an enlarged side elevational view of a preferred form of a brake pedal pivotally mounted to the frame of the chassis.

Figure 3 is a side elevational view of the manner of associating my improved booster structure with the frame of the chassis.

Figure 4 is a horizontal sectional view approximately on the line 4—4 of Figure 2.

Figure 5 is a transverse vertical cross sectional view approximately on the line 5—5 of Figure 3.

Figure 6 is an enlarged side elevational view of the booster structure having its working parts associated therewith differently from the position in Figure 3, and Figure 7 is a view of another relative position of said booster structure.

Figure 8 is a perspective view of the main part of the booster structure.

Referring in detail to the drawings, the numeral 5 designates generally a chassis frame having the brake equalizer 6 mounted pivotally and transversely thereof having the usual forward extending rod 7 connected to the pivoted brake foot pedal lever 8 pivoted on the frame 5 in position to be operated by the driver of the vehicle. It is obvious, of course, that my device is not limited to two wheel brakes, but may be equally as well applied to four wheel brakes. A preferred form or arrangement of the brake pedal is disclosed in Figure 2 in which the numeral 9 refers to the foot plate, the numeral 10 to the foot lever on the upper end of which is mounted the said foot plate. The foot lever is bent downwardly as at 11 and to provide the portion 12 the lower end of which is pivoted at the point 13 in a U-shaped structure 14 secured as at 15 to the frame 5. At the point of the bend 11 there is provided a suitable pivotal connection 16 for a clevis 17 carrying the rearwardly extending brake operating rod 18. The rod 18 instead of extending directly to the equalizer 6, extends a short distance to a point between the equalizer and the brake pedal. It is there associated with my improved booster structure. The booster structure comprises a generally rectangular block 19 which has a rectangular vertically elongated opening 20. The lower end of the block 19 is pivoted to the inside of a bearing block 21 secured to the underside of the chassis frame 5 as at 22, a pin 23 extending through the bearing 21 forms a pivot for the block 19. As seen in the drawings the block 19 is erected and normally is in practically vertical position. The rear end of the brake rod 18 has a U-shaped clevis 24 disposed about the sides of the block 19, and between the inner ends of the clevis 24 is pivoted a roller 25 on a pivot 26 through the said ends of the clevis. The roller 25 is adapted to roll upon the inner surface 27 of the rectangular opening 20. Another brake rod 28 connected with the equalizer 6 at its rear end and has its forward end provided with a clevis 29 and roller 30 similarly formed and constructed to the roller 25, and which rides upon the surface 31 directly opposite to the surface 27 of the opening 20.

The mechanical advantage of my improved booster will be evident upon the following considerations. The normal position of the rollers 25, 30 is illustrated in Figure 3. Upon a slight pressure being brought to bear upon the brake pedals 9, 10, the block 19 is pulled forwardly, so that as is evident the brake rod 28 will traverse a somewhat greater distance than the brake rod 18 in the initial stage of the depressing of the brake pedals 9, 10. As the pressure of the brake pedal is continued and the block 19 forwardly drawn, the roller 25 rolls upwardly on the surface 27 to the position shown in Figure 6 which is the intermediate position of the booster device, at which position the normal braking power such as is obtained in the ordinary brake mechanisms obtains. Upon the further forward positioning of the block 19 in a position shown in Figure 7 results in the roller 30 falling to the lowermost position. In the relative positions shown in Figure 7 the greatest braking force is applied, without materially increasing the manual or foot pressure on the brake pedals. Thus the greatest braking force is exerted with the minimum of application of force at the end of the braking stroke where the greatest power is most conveniently placeable. Thus, I provide a simple and inexpensive device for gradually increasing the braking force without a corresponding increase in the necessity to apply braking force to the brake pedal, so that at the end of the braking stroke, where the greatest braking power is desired, there is provided an increased braking force not obtainable with the ordinary type of braking mechanism.

It is to be definitely understood that I do not desire to limit the application of this invention to the particular modification set out herein to illustrate the principles thereof, and any change or changes may be made in material, or arrangement of parts consistent with the spirit and scope of the invention.

What is claimed is:—

1. A booster device adapted for incorporation in the brake systems of automobiles, comprising a pivotally mounted block, a front brake rod and a rear brake rod, the front brake rod having a pivotal connection at one end with the brake operating lever and a roller connection at its other end with the block, and the rear brake rod having a pivotal connection at one end to the brake and a roller connection at its other end with the block, said block comprising a generally rectangular body having a trapezuimal opening whereby substantially parallel vertical roller surfaces and upper and lower non-horizontal roller stop surfaces are provided, the roller of each brake rod being adapted to move within said opening and ride upon one of said roller surfaces and to be limited in its upward and downward movements by said stop surfaces when the brake operating lever is actuated and then released, said front and rear brake rod roller connections, and the pivot being the sole means for effecting and controlling the pivotal movement of the block.

2. A booster for a mechanical brake system comprising a pivotally mounted block having an opening defining a pair of spaced opposed vertical surfaces, a brake pedal rod having a U-shaped member at one end for embracing one side of the block, a rotatable bearing member carried between the legs of the U-shaped member for rolling engagement with one of the opposed vertical surfaces, a brake operating rod having a U-shaped member at one end for embracing the opposite side of the block, a rotatable bearing carried between the legs of the last mentioned U-shaped member in rolling engagement with the opposite opposed vertical surface of the block, the ends of the opening being disposed so as to cause the brake operating rod bearing member to be always above the brake pedal rod bearing member when the block is in such a vertical position that the vertical surfaces thereof are substantially at right angles to the brake pedal and brake operating rods, the brake operating rod bearing member being then and normally in engagement with the upper end of the opening and of the adjacent surface, and the brake pedal rod bearing member in engagement with the lower end of the opening and of the adjacent surface, whereby initial movement of the block in the direction of pull of the brake pedal rod will cause climbing of the brake pedal rod bearing member to the upper end of the opening and normal braking action initially produced, and whereby upon further movement of the block in the said direction the brake lever bearing member will be maintained at the top of the opening while the brake operating rod member will ride downwardly on its bearing surface toward and to the lower end of the opening in gradually increasing leverage relationship whereby the maximum increased leverage is obtained toward the end of movement of the brake pedal rod, said U-shaped members and the pivot being the sole means for effecting and controlling the pivotal movement of the block.

3. A booster for connection between a brake pedal means and brake operating means for increasing the mechanical advantage of the brake pedal means toward the end of its brake applying stroke comprising a block pivotally mounted at its lower end, an opening in the upper part of the block, said opening having substantially parallelly spaced vertical sides constituting bearing surfaces, said opening having its upper and lower ends substantially parallel but set at an angle to the bearing surfaces and constituting stop means; clevis means carried by the brake pedal means for loosely embracing one side of the block, friction reducing means carried by the clevis means within the opening of the block and movably engaged with the adjacent bearing surface, similar clevis means carried by the brake operating means and embracing the other side of the block, friction reducing means carried by the similar clevis means within the opening of the block and movably engaged with the bearing surface adjacent to it, said block being arranged to have an approximately vertical position when the brake pedal means and brake operating means are at rest, the brake pedal and brake operating means being then related to the bearing surfaces of the opening of the block at substantially right angles with the brake pedal clevis means engaged with the lower end of the opening and the brake operating clevis means positioned in engagement with the upper end of the opening, so that the brake operating means has a delayed action with respect to the brake pedal means, said brake pedal and brake operating clevis means and the pivot being the sole means for effecting and controlling the pivotal movement of the block.

4. The combination with a brake system having a pedal operated rod and a brake operating rod, of a block pivotally mounted at its lower end and provided with a parallelogram opening in its upper part whose vertical sides are parallel and define bearing surfaces, clevis means carried by the pedal rod embracing the adjacent side of the block and movably engaged with its bearing surface, similar clevis means carried by the brake rod embracing the remaining side of the block and movably engaged with its bearing surface, the bearing surfaces of the block being related to the said rods at substantially right angles when they are at rest with the pedal rod clevis means at the lower end of its bearing surface and the brake rod clevis means at the upper end of its bearing surface, initial partial pulling upon the pedal rod being adapted to effect a tilting of the block in the direction of movement thereof followed by climbing of the pedal rod clevis means to the upper end of its bearing surface for normal braking action, the remaining acutely angular sides of the opening in the block acting to prevent the pedal rod clevis means climbing as high as the position of the brake rod clevis means whereby the brake rod clevis means has always a delayed action with respect to the pedal rod clevis means, further actuation of the pedal rod effecting a further tilting of the block in the named direction with a consequent gradual movement of the brake rod clevis means toward the end of its bearing surface, a gradually increasing mechanical advantage being thereby produced from a point in the actuation of the pedal rod removed from initial movement thereof toward the end of its movement, said pedal rod and brake rod clevis means and the pivot being the sole means for effecting and controlling the pivotal movement of the block.

5. A booster of the type described, for a brake linkage system comprising a pivotally mounted block having opposed spaced vertical arms, a brake operating rod provided with means riding on one of the arms of the block, and a brake lever rod provided with means riding upon the other arm of the block whereby operation of the brake lever in one direction will move the block on its pivot and cause said brake lever rod to climb its arm, and cause the brake operating rod to move downwardly on its arm to increase the leverage, the brake operating rod means and the brake lever rod means and the pivot being the sole means for effecting and controlling the pivotal movement of the block.

In testimony whereof I affix my signature.

JOHN E. LUDWIG.